United States Patent
Takabatake et al.

(10) Patent No.: US 6,268,677 B1
(45) Date of Patent: Jul. 31, 2001

(54) ROTOR FOR PERMANENT MAGNET TYPE ROTATING MACHINE

(75) Inventors: Mikio Takabatake; Masanori Arata, both of Yokohama; Kazuto Sakai; Yutaka Hashiba, both of Yokosuka; Yoshio Hashidate, Fujisawa; Norio Takahashi, Yokohama; Koji Oishi, Mie-Ken; Shiro Amemori, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/537,408

(22) Filed: Mar. 29, 2000

(30) Foreign Application Priority Data

Mar. 30, 1999 (JP) .................................. 11-089928

(51) Int. Cl.$^7$ .................................. H02K 21/12
(52) U.S. Cl. .................................. 310/156.55; 310/156.45; 310/156.56; 310/156.57; 310/156.78; 310/156.83; 310/211
(58) Field of Search ................................... 310/156, 211, 310/212, 261, 264

(56) References Cited

U.S. PATENT DOCUMENTS

| | | | |
|---|---|---|---|
| 4,139,790 | 2/1979 | Steen | 310/156 |
| 4,568,846 | 2/1986 | Kapadia | 310/156 |
| 5,097,166 | 3/1992 | Mikulic | 310/156 |
| 5,990,593 | * 11/1999 | Narita et al. | 310/156 |
| 6,034,460 | * 11/1999 | Tajima et al. | 310/156 |

FOREIGN PATENT DOCUMENTS 0 352 573    1/1990    (EP) .
0 889 574    1/1999    (EP) .

OTHER PUBLICATIONS

K. J. Binns, et al., "High–Field Self–Starting Permanent–Magnet Synchronous Motor", IEE Proc., vol. 128, Pt. B, No. 3, May 1981, pp. 157–160.

M. Azizur Rahman, et al., "Field–Based Analysis for Permanent Magnet Motors", IEEE Transactins on Magnetics, vol. 30, No. 5, Sep. 1994, pp. 3664–3667.

Alfio Consoli, et al., "Transient Performance of Permanent Magnet AC Motor Drives", IEEE Transaction on Industry Applications, vol. 1A–22, No. 1, Jan./Feb. 1986, pp. 32–41.

* cited by examiner

*Primary Examiner*—Burton S. Mullins
(74) *Attorney, Agent, or Firm*—Oblon, Spivak, McClelland, Maier & Neustadt, P.C.

(57) ABSTRACT

A rotor is provided for a permanent magnet type rotating machine having a stator 1 with armature windings 11. The rotor 3 includes a rotor core 31 and a plurality of permanent magnets 32 arranged in the rotor core 31 so as to negate magnetic flux of the armature windings 11 passing through interpoles 3b. The rotor 3 is constructed so that the average of magnetic flux in an air gap 2 between the rotor 3 and the stator 1, which is produced by the permanent magnets 32 at the armature windings' de-energized, ranges from 0.1 [T] to 0.7 [T] and the ratio (Lq/Ld) of self-inductance of the magnetic portion in a hard-magnetizing direction (q-axis) to self-inductance in an easy-magnetizing direction (d-axis) under a rated load condition ranges from 0.1 to 0.8. Under these conditions, it is possible to realize the rotating machine which operates as an induction machine at the machine's starting and also operates as an synchronous machine at the rated driving due to smooth pull-in.

13 Claims, 6 Drawing Sheets

ROTOR FOR PERMANENT MAGNET TYPE ROTATING MACHINE

BACKGROUND OF THE INVENTION

1. Field of the Invention

The present invention relates to a rotor for a permanent magnet type rotating machine, which operates as an induction machine at the machine's starting and also a synchronizing machine at the rated driving.

2. Description of the Related Art

Generally, the permanent magnet-reluctance type rotating machine comprises a stator having armature windings and a rotor rotating inside the stator. In the machine, the rotor is provided with no windings forming a field system but with permanent magnets disposed on side faces of respective projecting portions of a rotor core having irregularities on its outer periphery. Therefore, the machine is characterized in that the structure is simple in comparison with the conventional wound-rotor type rotating machine.

Between the rotor core and the stator, this permanent magnet-reluctance type rotating machine has a small magnetic reluctance about each projecting portion and a large magnetic reluctance about each recessed portion due to the structural unevenness on the rotor core. In this way, there is a difference between the projecting portion and the recessed portion in terms of magnetic energy stored at a clearance (air gap) between the rotor core and the stator due to the current flowing through the armature windings, so that the output is mainly produced by the change in magnetic energy.

Note, the unevenness about the rotor is not necessarily provided by its geometrical structure and, in short, the "magnetic" unevenness may be formed about the rotor. Therefore, the rotating machine may be provided with a constitution by which the magnetic reluctance and flux can be changed dependently of the rotational position of the rotor.

Note, the reluctance type rotating machine using no permanent magnet has a problem of power reduction when the current flowing the armature windings increases since the leakage flux into the magnetically recessed portions, i.e. the interpole portions, is increased by the enlargement of magnetically saturated area in the projecting portions, i.e. the pole portions.

The permanent magnet-reluctance type rotating machine is capable of avoiding the deterioration of output since the permanent magnets on respective pole sides of the rotor core do act as the magnetic reluctance to reduce the leakage flux directing to the interpole portions.

In addition to the above-mentioned function to reduce the leakage flux, the permanent magnets have an effect to generate the reluctance torque due to the interaction between their own flux and the flux from the armature windings.

In this way, the permanent magnet-reluctance type rotating machine is constructed so as to exhibit different magnetic reluctance dependent on the rotational position of the rotor due to the magnetic unevenness about the peripheral face of the rotor core and also ensures the power output since the leakage flux for the interpole portions is reduced by the permanent magnets on the pole sides.

In the permanent magnet-reluctance type rotating machine, however, there is a problem of difficult self-starting because the self-retaining torque is increased by the permanent magnets on the pole sides.

In order to ensure the self-starting torque, there have been attempted many countermeasures, for example, to adopt an inverter as supplementary starting means, to overlap the rotor with an additional starting cage, etc. However, these countermeasures cause the structure of the rotating machine to be complicated overall. Especially in case of the self-starting cage, there is also raised a problem of increasing the magnetic reluctance to reduce the main magnetic flux.

Under the situation, the applicant of the present invention has previously proposed a rotor for the permanent magnet-reluctance type rotating machine which is capable of improving its starting characteristics without requiring any supplemental starting means (Japanese Patent Application No. 10-275797). In this machine, for example, the starting cage is made of magnetic material and starting conductors are provided in the form of a "deep-groove".

At the machine's starting, this permanent magnet-reluctance type rotating machine makes the starting conductors on the periphery of the rotor produce an induction torque corresponding to the change of armature current, thereby allowing the rotor to operate as the induction machine. At the machine's rated driving, the permanent magnet-reluctance type rotating machine allows the rotor to operate as the synchronous machine by both of the reluctance torque originated in the magnetic unevenness on the rotor surface and the torque based on the interaction of the flux of the permanent magnets on the pole sides with the flux from the armature windings.

As to the above-mentioned "self-starting" permanent magnet-reluctance type rotating machine, it is known that when the flux from the permanent magnets in the rotor core, namely, "magnet flux" gets large or the difference in magnetic reluctance between the projecting portions and the recessed portions of the rotor core gets large, the machine is apt to be started with difficulty.

It is also known that, conversely, if the magnet flux or reluctance is small, then the operative conversion is apt to be difficult at the machine's pull-in as one turning point from the starting operation as the induction machine to the normal operation as the synchronous machine.

In order to carry out the machine's starting and pull-in without a hitch, it is necessary to establish the number of magnet flux and the value of reluctance appropriately.

Despite the fact that the general tendencies of magnet flux and reluctance upon the machine's starting and pull-in operations has been recognized as mentioned above, there has not been provided any definite establishment against the magnet flux and the reluctance yet.

Therefore, there presently exists a situation where, for example, one permanent magnet-reluctance type is easy to start but hard for pull-in, while the other rotating machine is easy for its pull-in but hard to start.

SUMMARY OF THE INVENTION

It is therefore an object of the present invention to provide a rotor for a permanent magnet type rotating machine which is capable of operating as an induction machine at the machine's starting and also as a synchronizing machine owing to the smooth "pull in" for the synchronism at the machine's rated driving.

In order to accomplish the object described above, the present invention provides a rotor for a permanent magnet type rotating machine having a stator with armature windings, the rotor comprising a rotor core having a magnetic unevenness formed in a circumferential direction thereof, with magnetic portions; a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting. As the 1st. feature of the invention, the rotor is constructed so that the average of magnetic flux in an air gap between the rotor and the stator, which is produced by the permanent magnets with the armature windings' de-energized, ranges from 0.1 [T] to 0.7 [T] and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

With the above arrangement, it is possible to realize the rotating machine allowing its operation to be transferred from the machine's starting to synchronism smoothly.

In common with the inventions according to the 2nd.–7th. features described later, a rotor for a permanent magnet type rotating machine having a stator with armature windings, comprises a rotor core having a magnetic unevenness formed in a circumferential direction thereof, with magnetic portions; a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting; wherein a load connected to the rotor core is substantially proportional to a power frequency cubed.

First, the 2nd. feature of the invention resides in that the conductors' resistivity at the machine's regular driving substantially equals to the resistivity of aluminum; the rotor is constructed so that the average of magnetic flux in an air gap between the rotor and the stator, which is produced by the permanent magnets, ranges from 0.1 [T] to 0.5 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

The 3rd. feature of the invention resides in that the conductors' resistivity at the machine's regular driving equals 110% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.7.

The 4th. feature of the invention resides in that the conductors' resistivity at the machine's regular driving equals 120% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.6.

The 5th. feature of the invention resides in that the conductors' resistivity at the machine's regular driving equals 130% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

The 6th. feature of the invention resides in that the conductors' resistivity at the machine's regular driving equals 140% of the resistivity of aluminum; the rotor is constructed so that the average of magnetic flux in an air gap between the rotor and the stator, which is produced by the permanent magnets, ranges from 0.3 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

The 7th. feature of the invention resides in that the conductors' resistivity at the machine's regular driving equals 150% of the resistivity of aluminum; the rotor is constructed so that the average of magnetic flux in an air gap between the rotor and the stator, which is produced by the permanent magnets, ranges from 0.3 [T] to 0.7 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.4.

In accordance with the respective arrangements of the 2nd.–7th. features mentioned above, it is possible to realize the rotating machine allowing its operation to be transferred from the machine's starting to synchronism smoothly.

In common with the inventions according to the 8th.–13th. features described later, a rotor for a permanent magnet type rotating machine having a stator with armature windings, comprises a rotor core having a magnetic unevenness formed in a circumferential direction thereof, with magnetic portions; a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting; wherein a load connected to the rotor core equals substantial zero when the machine is operated at less than rated rotations, while the load is proportional to a power frequency cubed in case of more than the machine's rated rotations.

The 8th. feature of the invention resides in that the conductors' resistivity at the machine's regular driving substantially equals to the resistivity of aluminum; the rotor is constructed so that the average of magnetic flux in an air gap between the rotor and the stator, which is produced by the permanent magnets, ranges from 0.1 [T] to 0.5 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

The 9th. feature of the invention resides in that the conductors' resistivity at the machine's regular driving equals 110% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.7.

The 10th. feature of the invention resides in that the conductors' resistivity at the machine's regular driving equals 120% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.6.

The 11th. feature of the invention resides in that the conductors' resistivity at the machine's regular driving equals 130% of the resistivity of aluminum; the rotor is constructed so that the average of magnetic flux in an air gap between the rotor and the stator, which is produced by the permanent magnets, ranges from 0.2 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

The 12th. feature of the invention resides in that the conductors' resistivity at the machine's regular driving equals 140% of the resistivity of aluminum; the rotor is constructed so that the average of magnetic flux in an air gap between the rotor and the stator, which is produced by the permanent magnets, ranges from 0.3 [T] to 0.6 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

The 13th. feature of the invention resides in that the conductors' resistivity at the machine's regular driving equals 150% of the resistivity of aluminum; the rotor is constructed so that the average of magnetic flux in an air gap between the rotor and the stator, which is produced by the permanent magnets, ranges from 0.3 [T] to 0.7 [T]; and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.4.

In accordance with the respective arrangements of the 8th.–13th. features mentioned above, it is possible to realize the rotating machine allowing its operation to be transferred from the machine's starting to synchronism smoothly.

The 14th. feature of the invention resides in a rotor for a permanent magnet type rotating machine having a stator with armature windings, the rotor comprising: a rotor core having a magnetic unevenness formed in a circumferential direction thereof, with magnetic portions; a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting; wherein each of the conductors has a cross section in the form of an oblong with the longer sides arranged so as to extend along the radial direction of the rotor core, radially of the rotational center axis of the rotor core as a center.

The 15th. feature of the invention resides in a rotor for a permanent magnet type rotating machine having a stator with armature windings, the rotor comprising: a rotor core having a magnetic unevenness formed in a circumferential direction thereof, with magnetic portions; a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting; wherein each of the conductors has a cross section in the form of an isosceles triangle of which the base is arranged on the side of the periphery of the rotor core while the peak directs to the side of the center axis of the rotor core, and the conductors are also arranged radially of the rotational center axis of the rotor core as a center.

In accordance with the respective arrangements of the 14th. and 15th. features mentioned above, it is possible to realize the rotating machine allowing its operation to be transferred from the machine's starting to synchronism smoothly.

These and other objects and features of the present invention will become more fully apparent from the following description and appended claims taken in conjunction with the accompany drawings.

DESCRIPTION OF THE PREFERRED EMBODIMENT

Embodiments of the present invention will be described with reference to FIGS. 1 to 6, in detail.

Figure 1:
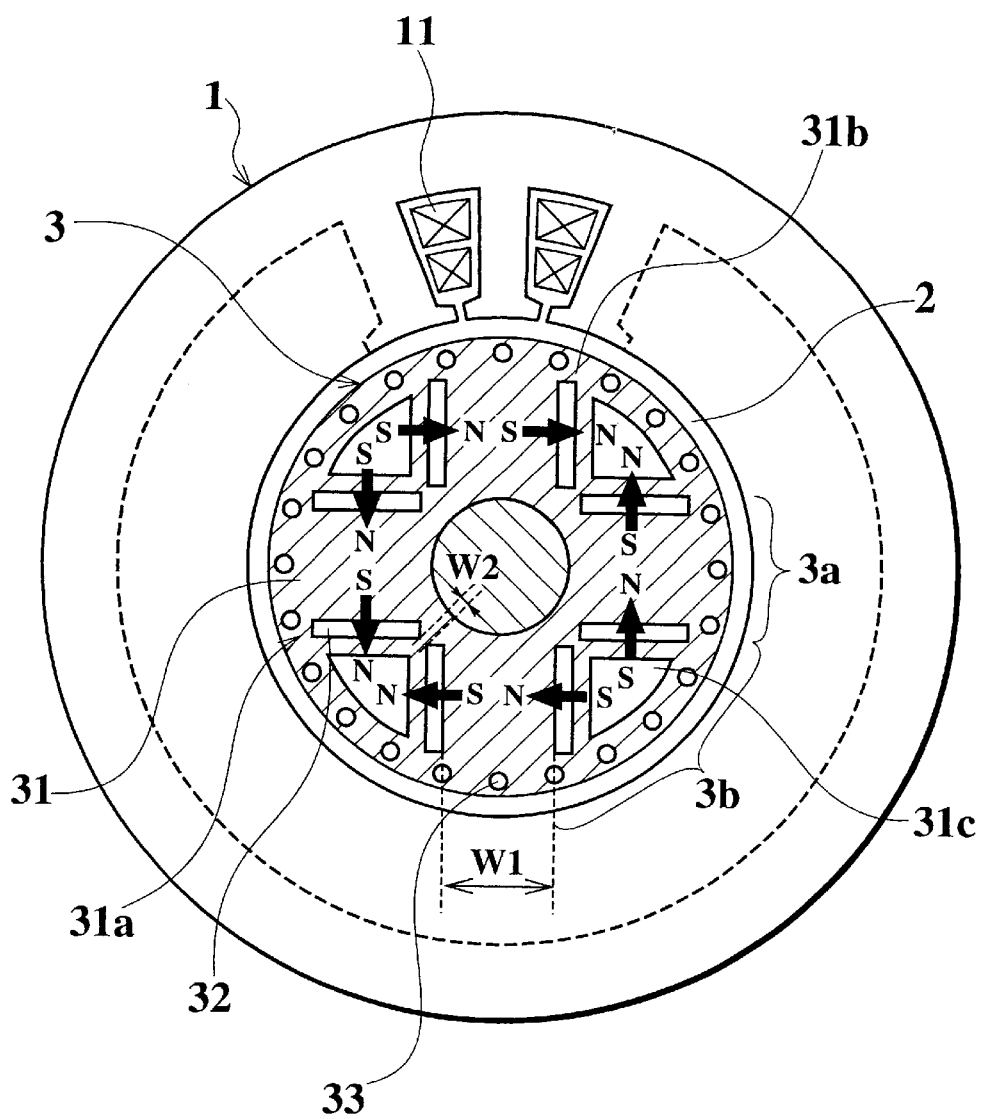
FIG. 1 is a cross sectional view of a permanent-magnet type rotating machine for explanation of the 1st embodiment to the 3rd. embodiment of the present invention, taken along the radial direction of the machine.

FIG. 1 is a cross sectional view of a rotating machine in accordance with the first embodiment of the present invention, taken along the radial direction of the machine. In FIG. 1, a stator 1 includes armature windings 11 and is constructed so as to accommodate a rotor 3 therein through a clearance (air gap) 2.

The rotor 3 includes a rotor core 31, permanent magnets 32 and starting conductors (conductive bars) 33 both embedded in the rotor core 31. The rotor core 31 is constituted by a lamination of electromagnetic steel plates each having eight cavities 31a formed along respective "easy-magnetizing" directions to facilitate the rotor's magnetization. Eight cavities 31a are arranged crosswise in the rotor core 31. The permanent magnets 32 are respectively embedded in these cavities 31a, so that projecting poles and recessed portions are alternately arranged about the rotor 3, providing four magnetic poles.

The permanent magnets 32 on both sides of each magnetic pole are magnetized in the identical direction so as to negate the magnetic flux of the armature windings 11 flowing along the adjoining recessed portions, namely, "hard-magnetizing" directions in opposition to the above easy-magnetizing directions. The permanent magnets 32 on both sides of each recessed portion are magnetized in the opposite directions to each other in the circumferential direction of the rotor core 31.

In other words, respective core portions each interposed between two parallel cavities 31a provide magnetically projecting parts, i.e., respective magnetic poles 3a extending in the easy-magnetizing directions, of a pole width W1 each. On the other hand, respective core portions each interposed between two perpendicularly adjoining cavities 31a provide magnetically recessed parts, i.e., respective interpoles 3b extending in the hard-magnetizing directions.

Recommended for the permanent magnets 32 are rare-earth permanent magnets of high energy product, preferably, Nd—Fe—B permanent magnets which are preferably magnetized in the generally-circumferential direction, more preferably, in directions substantially perpendicular to the axes of the magnetic poles 3a. In the rotor core 31, non-magnetic portions composed of fan-shaped cavities 31c are formed in vicinity of the peripheries of the interpoles 3b.

Further, the rotor core 31 has magnetic portions 31b each formed between each magnetic pole 3a and the adjoining interpole 3b and also between an outer end of the permanent magnet 32 and the peripheral face of the rotor 3. The permanent magnets 32 are established so that the flux density of the air gap 2 when the armature windings 11 are not excited is less than e.g. 0.58 tesla (T).

According to the embodiment of the invention, since the permanent magnets 32 are arranged sufficiently inside of the peripheral face of the rotor core 31, the flux of each permanent magnet 32 also passes through the magnetic portion 31b, so that the portion 31b is magnetically closed in a short-circuit.

In order to provide the rotating machine capable of operating as one induction machine at the machine's starting and also operating as one synchronizing machine at the rated driving as the result of smooth "pull in" for synchronism, the first embodiment has the following feature. That is, the radial thickness of each magnetic portion 31b, the thickness and surface area of each magnet 32 are respectively adjusted so that the average of magnetic flux produced in the air gap 2 with the armature windings' de-energized ranges from 0.1 [T] to 0.7 [T].

Figure 2:
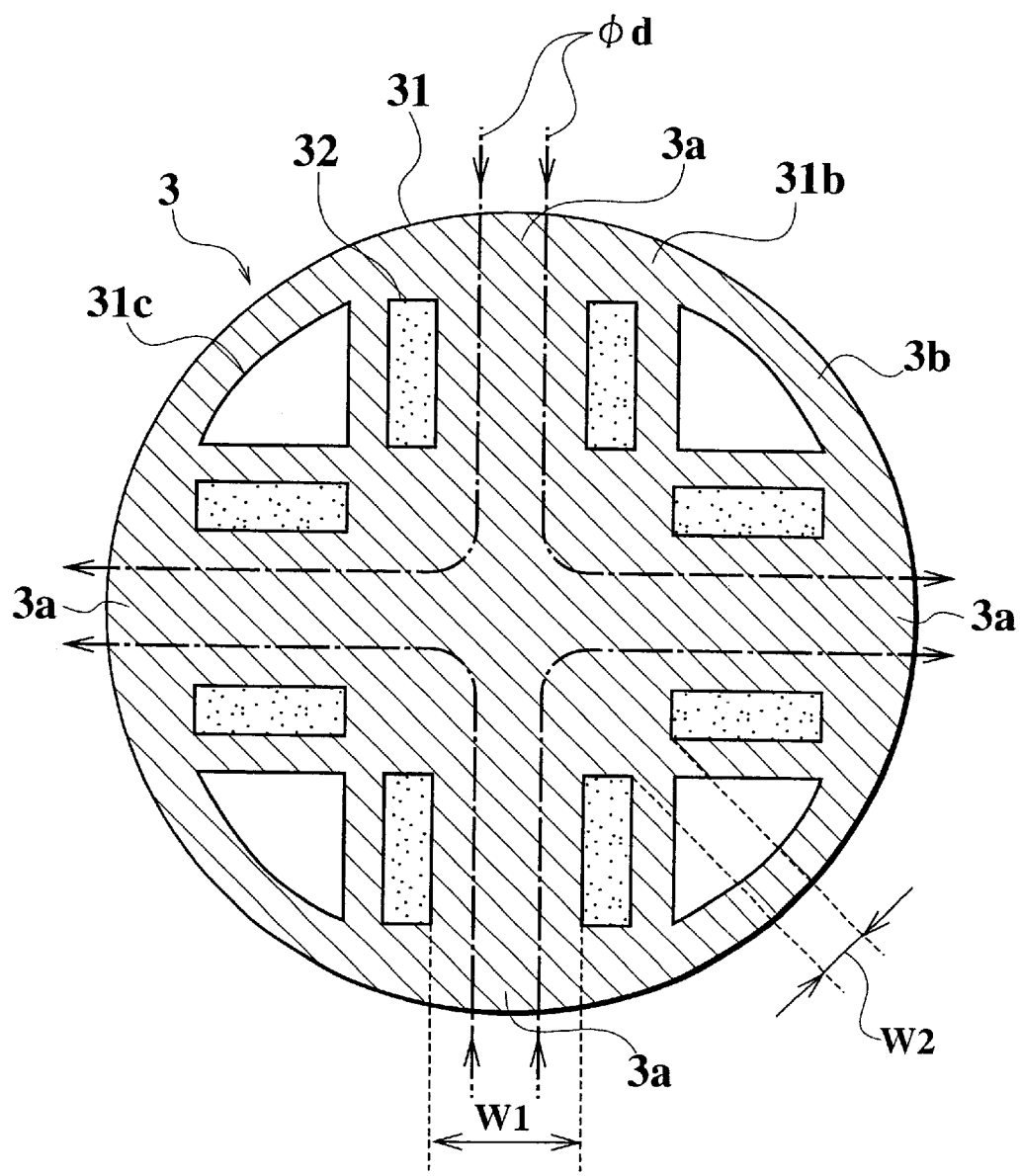
FIG. 2 is a cross sectional view of a rotor of FIG. 1 in the radial direction of the machine, showing the flow of flux due to armature currents in the component of directions along respective magnetic pole axes.

Simultaneously, the pole width W1 of the magnetic pole 3a and a width W2 are established so that the ratio (Lq/Ld) of a self-inductance (Lq) of the magnetic portion in the hard-magnetizing direction to a self-inductance (Ld) in the easy-magnetizing direction ranges from 0.1 to 0.8. As shown in FIGS. 1 and 2, the width W2 corresponds to a width of the magnetic portion 31b defined between the adjoining permanent magnets 32 interposing each interpole 3b on the side of the center of the rotor 3.

Figure 3:
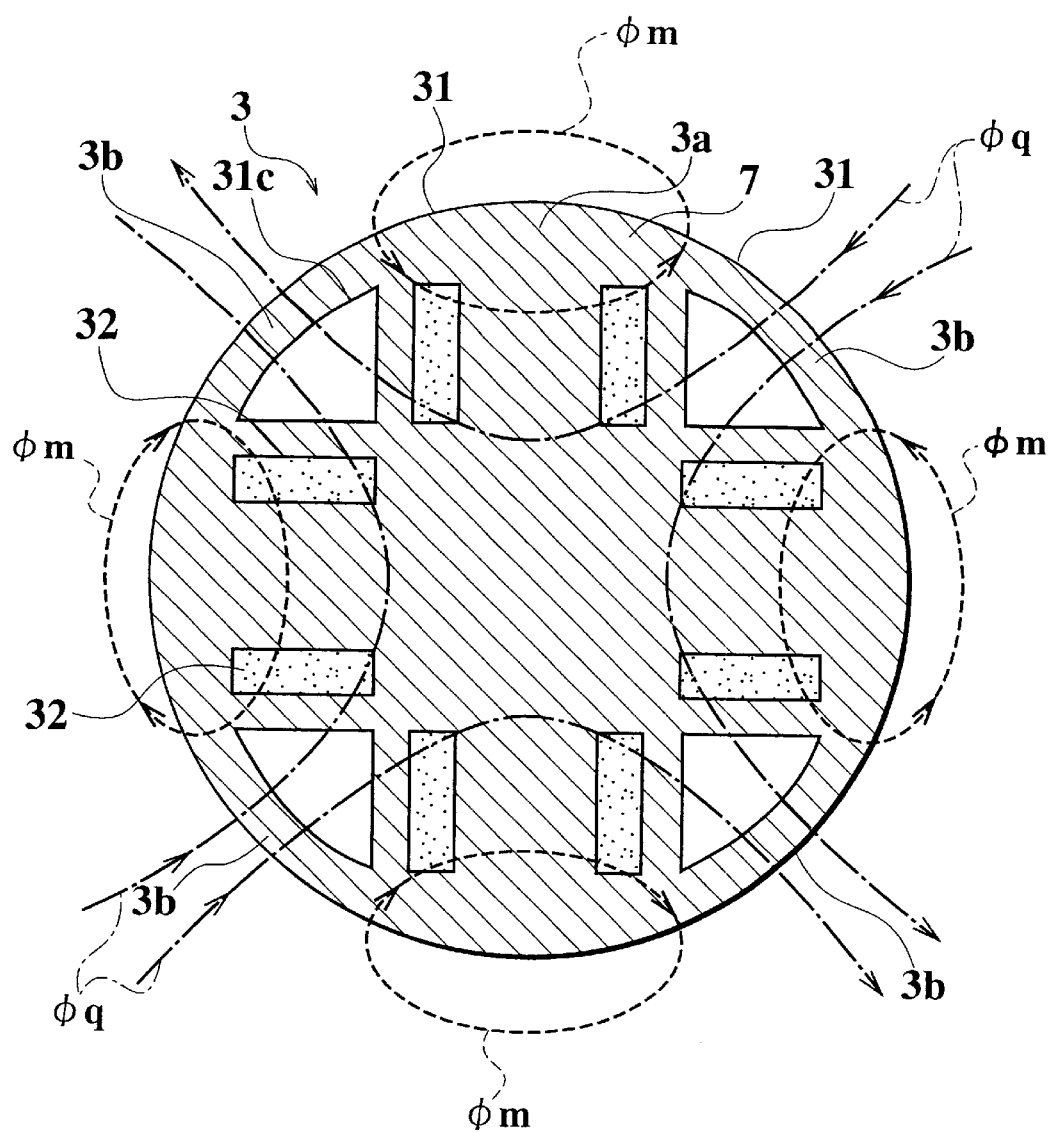
FIG. 3 is a cross sectional view of the rotor of FIG. 1 in the radial direction of the machine, showing the flow of flux due to armature currents in the component of directions along interpole center axes.
Figure 4:
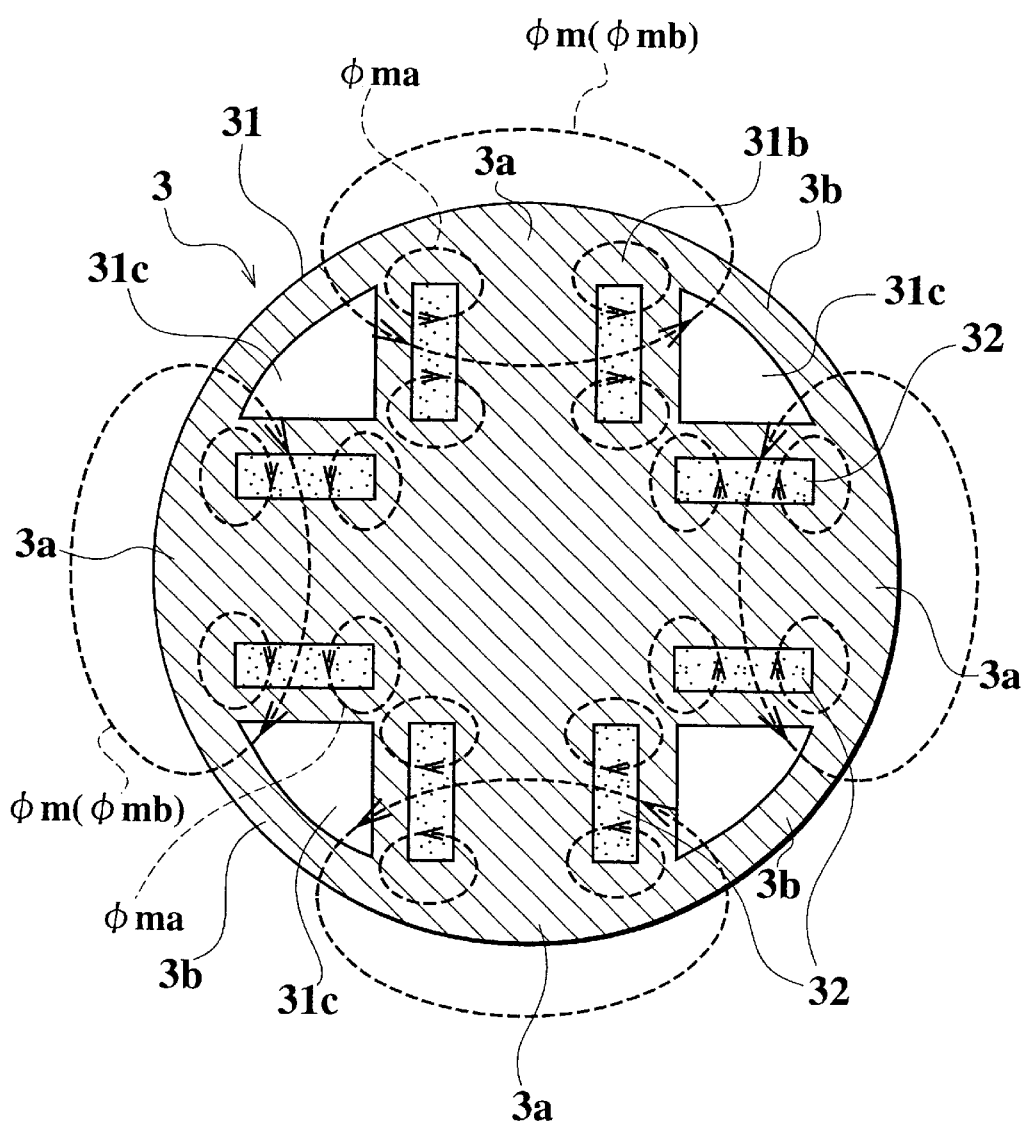
FIG. 4 is a cross sectional view of the rotor of FIG. 1 in the radial direction of the machine, showing the flow of flux due to permanent magnets in the rotor.

Next, we describe the operation of the rotor of the permanent magnet type rotating machine in accordance with the first embodiment of the invention with reference to FIGS. 2 to 4. Note, in FIG. 2 and thereafter, the above starting conductors (conductive bars) 33 arranged on the periphery of the rotor core 31 are eliminated for facilitating the understanding for the explanation.

That is, in FIG. 2, each magnetic flux ($\phi$d) designates a component of flux due to the armature current of the d-axis, in the direction along the pole 3a of the rotor core 31. Because of the magnetic path of each magnetic pole 3a, the magnetic reluctance of the above flux ($\phi$d) is extremely small, so that the magnetic flux can be produced with ease.

While, in FIG. 3, each magnetic flux ($\phi$q) designates a component of flux due to the armature current of the q-axis, in the radial direction along the interpole 3b of the rotor core 31. Although the magnetic flux ($\phi$q) forms the magnetic path crossing the permanent magnets 32 in the interpoles 3b, the flux by the armature current is deteriorated by the action of high reluctance of the permanent magnets 32 because of its relative permeability of approx. 1.

Therefore, as mentioned above, each permanent magnet 32 is magnetized in the direction substantially perpendicular to the axis of the pole 3a. Thus, as shown in FIG. 4, the flux flow starting from one pole of one permanent magnet 32 passes in the following order: the magnetic portion 31a on the boundary of the periphery of the rotor core 31 in the circumferential direction, the magnetic pole 3a and the opposite pole of the above permanent magnet 32, thereby forming a magnetic circuit ($\phi$ma).

While, the partial flux from one permanent magnet 32 also passes through the following elements in order: the air gap 2, the not-shown stator 1 and the magnetic pole 3a of the rotor 3 (or the adjacent magnet 32) and returns to the original magnet 32, forming a magnetic circuit ($\phi$mb).

Accordingly, as shown in FIG. 3, the interlinkage flux ($\phi$m) of the permanent magnets 32 is distributed in the opposite direction to the magnetic flux ($\phi$q) passing through the interpoles 3b toward the center of the rotor 3 by the armature current of q-axis, so that the magnetic flux ($\phi$q) of the armature windings 11 entering through the interpoles 3b is repelled for negation.

In the air gap 2 above the interpoles 3b, the flux density produced at the gap 2 by the not-shown armature windings 11, namely, gap flux density is reduced by the flux from the permanent magnets 32, producing a great variation in comparison with the gap flux density above the poles 3a. In this way, a large change in magnetic energy can be obtained by the change in gap flux density with respect to the position of the rotor 3.

Further, the magnetic portions 31b of the rotor core 31, each of which forms a short circuit between the pole 3a and the interpole 3b, are magnetically saturated by load currents in case of the machine being loaded, so that the magnetic flux of the magnets 32 distributed into the interpoles 3b is increased. Therefore, since there can be produced an unevenness in the distribution of gap flux density by the magnetic reluctance and flux of the permanent magnets 32, the rotating machine is capable of obtaining a great reluctance torque.

Meanwhile, it is noted that the reluctance torque originating in the difference in magnetic energy between the pole 3a and the interpole 3b is a sort of synchronous torque.

Further noted, the permanent magnet type rotating machine equipped with the rotor of the embodiment operates as an induction machine at the machine's starting and also as a synchronizing machine at the machine's rated driving. Thus, in order to perform the machine's smooth shifting from its induction drive to the synchronous drive, the synchronous torque representing the reluctance torque as mentioned above is necessary. Besides the reluctance torque, there exists a magnet torque which is generated by the interaction between the flux of the permanent magnets 32 and the armature windings 11, in the synchronous torque. In order to perform the above shifting from the induction to the synchronism appropriately and smoothly, it is desirable to set the synchronous torque large.

In order to enlarge the synchronous torque, one only has to increase the magnet torque by reducing the width of the magnetic portion 31b between the magnet end and the periphery of the rotor 3 for the magnetic saturation in manner that the magnet flux extends into the gap 2. Alternatively, one only has to increase the reluctance torque by increasing the pole width W1.

Also, it should be noted that the induction torque at the machine's starting is generated by the armature current. In detail, a time change in armature flux interlinking with the cage-shaped conductors on the outer periphery of the rotor 3.

However, since the permanent magnets 32 disposed in the rotor 3 are magnetized in the direction to negate the armature flux, the magnet flux from the permanent magnets 32 operates in the direction to negate the time change in armature flux interlinking with the cage-shaped conductors. In other words, the flux of the permanent magnets 32 acts to reduce the induction torque at the machine's starting.

In addition, if there exists a magnetic unevenness on the periphery of the rotor 3, then the armature flux is difficult to generate because of elevated magnetic reluctance in the hard-magnetizing direction (q-axis).

Consequently, the interlinkage flux with the conductors 33 is reduced to deteriorate the starting torque.

Being eager to enter into the rotor core 31 through the only easy-magnetizing direction (q-axis), the armature flux does cross with the conductors 33 on the periphery of the rotor 3 partially, so that the starting torque is reduced.

That is, in order to facilitate the machine's starting, it is desirable that the magnet flux is small together with the magnetic unevenness. In this way, the measures for facilitating the starting are contrary to the measures for facilitating the synchronism.

In order to realize the rotating machine which is capable of operating as the induction machine at the machine's starting and also as the synchronizing machine at the machine's rated driving, the embodiments of the invention do present the following conditions while providing the flux of the permanent magnets and the magnetic unevenness with appropriate values.

Thus, in the rotor of the permanent magnet type rotating machine of the embodiment, the magnetic portion 31b is defined between the pole 3a and the interpole 3b and between the end of the magnet 32 and the periphery of the rotor core 31 so that the average of magnetic flux in the air gap 2, which is produced by the permanent magnets 32 with the armature windings' de-energized, ranges from 0.1 [T] to 0.7 [T]. Further, the rotor is also constructed so as to provide the reluctance with more appropriate values by changing the magnet flux and the pole width W1 respectively.

Preferably, the pole width W1 ranges from 0.3 to 0.5 times as long as one pole pitch (i.e. a circumferential length from one center of one pole to another center of the neighboring pole).

Further, the pole width W1 and the magnetic portion's width W2 between the adjoining magnets 32 are established so that the ratio (Lq/Ld) of self-inductance (Lq) of the magnetic portion in the hard-magnetizing direction to self-inductance (Ld) in the easy-magnetizing direction, ranges from 0.1 to 0.8.

With the above relationship, it is possible to realize a rotating machine which can operate as an induction machine at the machine's starting and also operate as a synchronous machine at the rated driving owing to the smooth pull-in.

Next, we describe the rotor of the permanent magnet type rotating machine in accordance with the 2nd. embodiment. Note, throughout the respective embodiments mentioned later, there will be eliminated detailed descriptions for constituents which are identical to those of the first embodiment.

That is, the 2nd. embodiment mentioned below is on the assumption that the rotor 3 is connected to the load substantially proportional to a rotor's frequency cubed. In the 1st. example, the rotor is constructed in a manner that the resistivity of the conductors 33 on the periphery of the rotor 3 substantially equals to the resistivity of aluminum.

Further, in the 1st. example, the magnetic portion 31b is defined between the pole 3a and the interpole 3b and between the end of the magnet 32 and the periphery of the rotor core 31 so that the average of magnetic flux produced by the permanent magnets 32 with the armature windings' de-energized, ranges from 0.1 [T] to 0.5 [T] in the air gap 2. The pole width W1 and the width W2 of the magnetic portion between the adjoining magnets 32 are established so that the ratio (Lq/Ld) of self-inductance (Lq) of the magnetic portion in the hard-magnetizing direction to self-inductance (Ld) in the easy-magnetizing direction, ranges from 0.1 to 0.8.

In the 2nd. example, the resistivity of the conductors 33 is equal to 110% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2 and the ratio (Lq/Ld) of self-inductance in the hard-magnetizing direction to self-inductance in the easy-magnetizing direction ranges from 0.1 to 0.7.

In the 3rd. example, the resistivity of the conductors 33 is equal to 120% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2, and the ratio (Lq/Ld) of self-inductance in the hard-magnetizing direction to self-inductance in the easy-magnetizing direction ranges from 0.1 to 0.6.

In the 4th. example, the resistivity of the conductors 33 is equal to 130% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2, and the ratio (Lq/Ld) of self-inductance in the hard-magnetizing direction to self-inductance in the easy-magnetizing direction ranges from 0.1 to 0.5.

In the 5th. example, the resistivity of the conductors 33 is equal to 140% of the resistivity of aluminum. Then, the magnetic portion 31b, the pole width W1 and the width W2 are respectively established so that the average of magnetic flux produced by the permanent magnets 32 with the armature windings' de-energized, ranges from 0.3 [T] to 0.6 [T] in the air gap 2, and the ratio (Lq/Ld) of self-inductance in the hard-magnetizing direction to self-inductance in the easy-magnetizing direction ranges from 0.1 to 0.5.

In the 6th. example, the resistivity of the conductors 33 is equal to 150% of the resistivity of aluminum. Then, the magnetic portion 31b, the pole width W1 and the width W2 are respectively established so that the average of magnetic flux produced by the permanent magnets 32 with the armature windings' de-energized, ranges from 0.3 [T] to 0.7 [T] in the air gap 2, and the ratio (Lq/Ld) of self-inductance in the hard-magnetizing direction to self-inductance in the easy-magnetizing direction ranges from 0.1 to 0.4.

Next, we describe the 3rd. embodiment of the invention. In this embodiment, the rotor is driven under no load, i.e. substantial "zero" from the machine's starting to synchronism. After reaching the rated rotations, the rotor is connected to the load substantially proportional to a rotor's frequency cubed. Under the condition, in the 1st. example, the resistivity of the conductors 33 on the periphery of the rotor 3 is substantially equal to the resistivity of aluminum. Further, the magnetic portion 31b is defined so that the average of magnetic flux produced by the permanent magnets 32 with the armature windings' de-energized ranges from 0.1 [T] to 0.5 [T] in the air gap 2, while the magnet flux and the reluctance are established so as to have appropriate values, respectively.

The pole width W1 and the width W2 of the magnetic portion between the adjoining magnets 32 are established so that the ratio (Lq/Ld) of self-inductance (Lq) of the magnetic portion in the hard-magnetizing direction to self-inductance (Ld) in the easy-magnetizing direction, ranges from 0.1 to 0.8. Consequently, there can be provided a rotating machine which operates as an induction machine at the machine's starting and also operates as a synchronous machine at the rated driving, smoothly.

In the 2nd. example, the resistivity of the conductors 33 is equal to 110% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2 and the ratio (Lq/Ld) of self-inductance in the hard-magnetizing direction to self-inductance in the easy-magnetizing direction ranges from 0.1 to 0.7.

In the 3rd. example, the resistivity of the conductors 33 is equal to 120% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2, and the ratio (Lq/Ld) of self-inductance in the hard-magnetizing direction to self-inductance in the easy-magnetizing direction ranges from 0.1 to 0.6.

In the 4th. example, the resistivity of the conductors 33 is equal to 130% of the resistivity of aluminum. Then, the magnetic portion 31b, the pole width W1 and the width W2 are respectively established so that the average of magnetic flux produced by the permanent magnets 32 with the armature windings' de-energized, ranges from 0.2 [T] to 0.6 [T] in the air gap 2, and the ratio (Lq/Ld) of self-inductance in the hard-magnetizing direction to self-inductance in the easy-magnetizing direction ranges from 0.1 to 0.5.

In the 5th. example, the resistivity of the conductors 33 is equal to 140% of the resistivity of aluminum. Then, the magnetic portion 31b, the pole width W1 and the width W2 are respectively established so that the average of magnetic flux produced by the permanent magnets 32 with the armature windings' de-energized, ranges from 0.3 [T] to 0.6 [T] in the air gap 2, and the ratio (Lq/Ld) of self-inductance in the hard-magnetizing direction to self-inductance in the easy-magnetizing direction ranges from 0.1 to 0.5.

In the 6th. example, the resistivity of the conductors 33 is equal to 150% of the resistivity of aluminum. Then, the magnetic portion 31b, the pole width W1 and the width W2 are respectively established so that the average of magnetic flux produced by the permanent magnets 32 with the armature windings' de-energized, ranges from 0.3 [T] to 0.7 [T] in the air gap 2, and the ratio (Lq/Ld) of self-inductance in the hard-magnetizing direction to self-inductance in the easy-magnetizing direction ranges from 0.1 to 0.4.

On the basis that the rotor is driven under no load, i.e. substantial "zero" from the machine's starting to synchronism and, after reaching the rated rotations, the rotor is connected to the load substantially proportional to a rotor's frequency cubed, owing to the establishment of: resistivity of the conductors 33; average of magnetic flux produced by the permanent magnets 32 with the armature windings' de-energized; and ratio (Lq/Ld) of self-inductance in the hard-magnetizing direction to self-inductance in the easy-magnetizing direction, it is possible to provide a rotating machine which operates as an induction machine at the machine's starting and also operates as a synchronous machine at the rated driving, smoothly.

Figure 5:
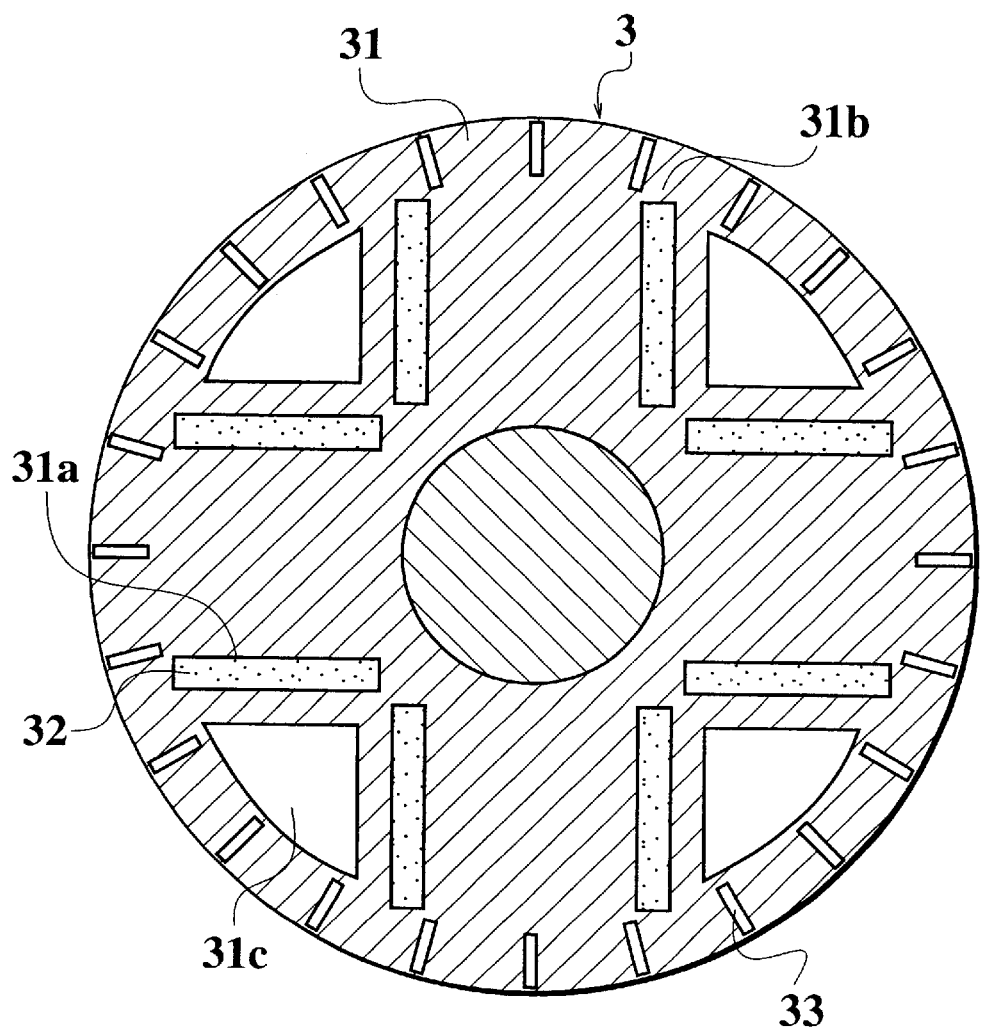
FIG. 5 is an explanatory cross sectional view of the rotor of the permanent-magnet type rotating machine in accordance with the 4th. embodiment of the present invention, taken along the radial direction of the machine.

FIG. 5 is a cross sectional view of the rotor of the permanent-magnet type rotating machine in accordance with the 4th. embodiment of the present invention, taken along the radial direction of the machine. According to the embodiment, the conductors (conductive bars) 33 are arranged in the periphery of the rotor core 31 in the circumferential direction. As shown in the figure, each conductor 33 is shaped to have an oblong cross section characterized by sufficiently long sides in comparison with the other sides. In arrangement, the conductors 33 are arranged radially with respect to the rotational center axis of the rotor core 31 as a center in a manner that the respective long sides of the cross sections extend along the radial direction of the rotor 3.

Although the induction torque at the machine's starting is proportional to the time variation rate of interlinkage flux of the armature windings 11 with the starting conductors 33 and also the resistance of conductor 33, the flux does not enter the interior of rotor core more than the surface of the rotor by the skin effect of alternating flux since the flux of high frequency is produced at the machine's starting.

Therefore, since the cross section of the conductor 33 is shaped long in the radial direction of the rotor 3 and short in the circumferential direction, the induction current flows through the only outer ends of the conductors 33 by the skin effect, which is equivalent to a case of reducing the cross sections of the conductors 33. In other words, the rotor 3 having the so-shaped conductors 33 is equivalent to a condition of elevating the resistance of each conductor 33, so that it is possible to generate the starting torque effectively.

Additionally, because of its narrowness of each conductor 33 in the circumferential direction of the rotor 3, the magnetic path in each pole 3a is so broadened to facilitate the flow of flux in the easy-magnetizing direction furthermore, causing the reluctance torque to be increased. Consequently, owing to the starting torque which is effectively ensured at the machine's starting and the reluctance torque which is effectively generated at the machine's rated driving, it is possible to realize a rotating machine which operates as an induction machine at the machine's starting and also operates as a synchronous machine at the rated driving.

Figure 6:
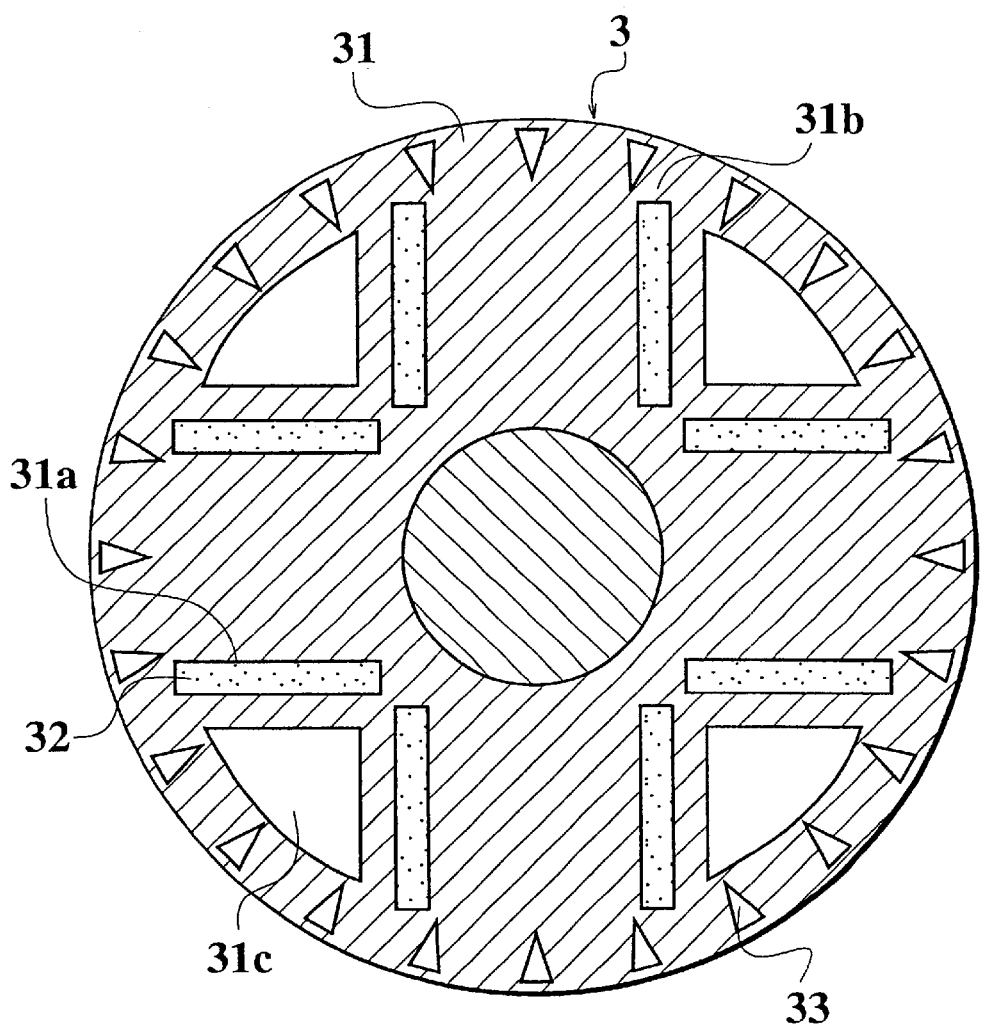
FIG. 6 is a cross sectional view of the rotor of the permanent-magnet type rotating machine in accordance with the 5th. embodiment of the present invention, taken along the radial direction of the machine.

FIG. 6 is a cross sectional view of the rotor of the permanent-magnet type rotating machine in accordance with the 5th. embodiment of the present invention, taken along the radial direction of the machine. According to the embodiment, the rotor core 31 is provided, on the peripheral part, with the conductors 33 which can generate the induced current at the machine's starting to ensure the starting torque. As shown in the figure, each conductor 33 has a cross section in the form of an isosceles triangle of which the base is arranged on the side of the periphery of the rotor core 31 while the peak is directed to the side of the center axis with respect to the rotor core 31. These conductors 33 are arranged radially of the rotational center axis of the rotor core 31 as a center.

Note, the width of the isosceles triangular conductor's part in the circumferential direction of the rotor 3 gets larger as the part approaches the base. That is, by positioning each conductor's base of the largest width on the outer peripheral portion of the rotor 3 having a circumferential length in comparison with that of the inner peripheral portion, it is possible to ensure a magnetic path in the easy-magnetizing direction, which is broader than that in case of arranging each conductor's base on the inner peripheral side of the rotor core 31, thereby increasing the reluctance torque.

Furthermore, since the starting torque is generated by the starting current induced in the conductors 33 at the machine's starting and the large reluctance torque can be obtained at the machine's rated driving, it is possible to realize a rotating machine which can transfer from its operation as an induction machine at the machine's starting to the operation as a synchronous machine at the rated driving, smoothly.

As mentioned above, owing to the establishment of: pole width, width of magnetic portion between the adjoining magnets, magnet flux, ratio of self-inductance of the magnetic portion in the hard-magnetizing direction to self-inductance in the easy-magnetizing direction, and configurations of conductors (i.e. oblong, isosceles triangle), the rotor of the permanent magnet type rotating machine is capable of smooth pull-in for the machine's synchronism thereby to provide a great effect for practical use.

Finally, it will be understood by those skilled in the art that the foregoing descriptions are preferred embodiments of the rotating machine, and that various changes and modifications may be made to the present invention without departing from the spirit and scope thereof.

What is claimed is:

1. A rotor for a permanent magnet type rotating machine having a stator with armature windings, the rotor comprising:
   a rotor core having magnetic portions and having a magnetic unevenness formed in a circumferential direction thereof;
   a plurality of permanent magnets arranged in the rotor core so as to negate magnetic flux originating in the armature windings and also passing between adjoining magnetic poles; and
   conductors arranged in the periphery of the rotor core to produce a starting torque by the generation of induced current at the machine's starting;
   wherein the rotor is constructed so that the average of magnetic flux in the air gap between the rotor and the stator, which is produced by the permanent magnets with the armature windings' de-energized, ranges from 0.1 (T) to 0.7 (T); and
   the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

2. A rotor for a permanent magnet type rotating machine having a stator with armature windings, the rotor comprising:
   a rotor core having magnetic portions and having a magnetic unevenness formed in a circumferential direction thereof;
   a plurality of permanent magnets arranged in the rotor core so as to negate magnetic flux originating in the armature windings and also passing between adjoining magnetic poles; and
   conductors arranged in the periphery of the rotor core to produce a starting torque by the generation of induced current at the machine's starting;
   wherein a load connected to the rotor core is substantially proportional to a power frequency cubed;
   the conductors' resistivity during regular driving of the machine substantially equals the resistivity of aluminum;
   the rotor is constructed so that the average of magnetic flux in an air gap between the rotor and the stator, which is produced by the permanent magnets, ranges from 0.1 (T) to 0.5 (T); and
   the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

3. A rotor for a permanent magnet type rotating machine having a stator with armature windings, the rotor comprising:
   a rotor core having magnetic portions and having a magnetic unevenness formed in a circumferential direction thereof;
   a plurality of permanent magnets arranged in the rotor core so as to negate magnetic flux originating in the armature windings and also passing between adjoining magnetic poles; and
   conductors arranged in the periphery of the rotor core to produce a starting torque by the generation of induced current at the machine's starting;
   wherein a load connected to the rotor core is substantially proportional to a power frequency cubed;
   the conductors' resistivity during regular driving of the machine equals 110% of the resistivity of aluminum;
   the rotor is constructed so that the average of magnetic flux in the air gap between the rotor and the stator, which is produced by the permanent magnets, ranges from 0.2 (T) to 0.6 (T); and
   the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.7.

4. A rotor for a permanent magnet type rotating machine having a stator with armature windings, the rotor comprising:

a rotor core having magnetic portions and having a magnetic unevenness formed in a circumferential direction thereof;

a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting;

wherein a load connected to the rotor core is substantially proportional to a power frequency cubed;

the conductors' resistivity during regular driving of the machine equals 120% of the resistivity of aluminum;

the rotor is constructed so that the average of magnetic flux in the air gap between the rotor and the stator, which is produced by the permanent magnets, ranges from 0.2 (T) to 0.6 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.6.

5. A rotor for a permanent magnet type rotating machine having a stator with armature windings, the rotor comprising:

a rotor core having magnetic portions and having a magnetic unevenness formed in a circumferential direction thereof;

a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting;

wherein a load connected to the rotor core is substantially proportional to a power frequency cubed;

the conductors' resistivity during regular driving of the machine equals 130% of the resistivity of aluminum;

the rotor is constructed so that the average of magnetic flux in the air gap between the rotor and the stator, which is produced by the permanent magnets, ranges from 0.2 (T) to 0.6 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

6. A rotor for a permanent magnet type rotating machine having a stator with armature windings, the rotor comprising:

a rotor core having magnetic portions and having a magnetic unevenness formed in a circumferential direction thereof;

a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting;

wherein a load connected to the rotor core is substantially proportional to a power frequency cubed;

the conductors' resistivity during regular driving of the machine equals 140% of the resistivity of aluminum;

the rotor is constructed so that the average of magnetic flux in the air gap between the rotor and the stator, which is produced by the permanent magnets, ranges from 0.3 (T) to 0.6 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

7. A rotor for a permanent magnet type rotating machine having a stator with armature windings, the rotor comprising:

a rotor core having magnetic portions and having a magnetic unevenness formed in a circumferential direction thereof;

a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting;

wherein a load connected to the rotor core is substantially proportional to a power frequency cubed;

the conductors' resistivity during regular driving of the machine equals 150% of the resistivity of aluminum;

the rotor is constructed so that the average of magnetic flux in the air gap between the rotor and the stator, which is produced by the permanent magnets, ranges from 0.3 (T) to 0.7 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.4.

8. A rotor for a permanent magnet type rotating machine having a stator with armature windings, the rotor comprising:

a rotor core having magnetic portions and having a magnetic unevenness formed in a circumferential direction thereof;

a plurality of permanent magnets arranged in the rotor core so as to negate magnetic flux originating in the armature windings and also passing between adjoining magnetic poles; and conductors arranged in the periphery of the rotor core to produce a starting torque by the generation of induced current at the machine's starting;

wherein a substantially zero load is connected to the rotor core when the machine is operated below a rated rotation value, while the load is proportional to a power frequency cubed when the machine is operated above the rated rotation value;

the conductors' resistivity during regular driving of the machine substantially equals to the resistivity of aluminum;

the rotor is constructed so that the average of magnetic flux in the air gap between the rotor and the stator, which is produced by the permanent magnets, ranges from 0.1 (T) to 0.5 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.8.

9. A rotor for a permanent magnet type rotating machine having a stator with armature windings, the rotor comprising:
   a rotor core having magnetic portions and having a magnetic unevenness formed in a circumferential direction thereof;
   a plurality of permanent magnets arranged in the rotor core so as to negate magnetic flux originating in the armature windings and also passing between adjoining magnetic poles; and
   conductors arranged in the periphery of the rotor core to produce a starting torque by the generation of induced current at the machine's starting;
   wherein a substantially zero load is connected to the rotor core when the machine is operated below a rated rotation value, while the load is proportional to a power frequency cubed when the machine is operated above the rated rotation value;
   the conductors' resistivity during regular driving of the machine equals 110% of the resistivity of aluminum;
   the rotor is constructed so that the average of magnetic flux in the air gap between the rotor and the stator, which is produced by the permanent magnets, ranges from 0.2 (T) to 0.6 (T); and
   the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.7.

10. A rotor for a permanent magnet type rotating machine having a stator with armature windings, the rotor comprising:
    a rotor core having magnetic portions and having a magnetic unevenness formed in a circumferential direction thereof;
    a plurality of permanent magnets arranged in the rotor core so as to negate magnetic flux originating in the armature windings and also passing between adjoining magnetic poles; and
    conductors arranged in the periphery of the rotor core to produce a starting torque by the generation of induced current at the machine's starting;
    wherein a substantially zero load is connected to the rotor core when the machine is operated below a rated rotation value, while the load is proportional to a power frequency cubed when the machine is operated above the rated rotation value;
    the conductors' resistivity during regular driving of the machine equals 120% of the resistivity of aluminum;
    the rotor is constructed so that the average of magnetic flux in the air gap between the rotor and the stator, which is produced by the permanent magnets, ranges from 0.2 (T) to 0.6 (T); and
    the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.6.

11. A rotor for a permanent magnet type rotating machine having a stator with armature windings, the rotor comprising:
    a rotor core having magnetic portions and having a magnetic unevenness formed in a circumferential direction thereof;
    a plurality of permanent magnets arranged in the rotor core so as to negate magnetic flux originating in the armature windings and also passing between adjoining magnetic poles; and
    conductors arranged in the periphery of the rotor core to produce a starting torque by the generation of induced current at the machine's starting;
    wherein a substantially zero load is connected to the rotor core when the machine is operated below a rated rotation value, while the load is proportional to a power frequency cubed when the machine is operated above the rated rotation value;
    the conductors' resistivity during regular driving of the machine equals 130% of the resistivity of aluminum;
    the rotor is constructed so that the average of magnetic flux in the air gap between the rotor and the stator, which is produced by the permanent magnets, ranges from 0.2 (T) to 0.6 (T); and
    the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

12. A rotor for a permanent magnet type rotating machine having a stator with armature windings, the rotor comprising:
    a rotor core having magnetic portions and having a magnetic unevenness formed in a circumferential direction thereof;
    a plurality of permanent magnets arranged in the rotor core so as to negate magnetic flux originating in the armature windings and also passing between adjoining magnetic poles; and
    conductors arranged in the periphery of the rotor core to produce a starting torque by the generation of induced current at the machine's starting;
    wherein a substantially zero load is connected to the rotor core when the machine is operated below a rated rotation value, while the load is proportional to a power frequency cubed when the machine is operated above the rated rotation value;
    the conductors' resistivity during regular driving of the machine equals 140% of the resistivity of aluminum;
    the rotor is constructed so that the average of magnetic flux in the air gap between the rotor and the stator, which is produced by the permanent magnets, ranges from 0.3 (T) to 0.6 )T); and
    the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.5.

13. A rotor for a permanent magnet type rotating machine having a stator with armature windings, the rotor comprising:
    a rotor core having magnetic portions and having a magnetic unevenness formed in a circumferential direction thereof;
    a plurality of permanent magnets arranged in the rotor core so as to negate magnetic flux originating in the armature windings and also passing between adjoining magnetic poles; and
    conductors arranged in the periphery of the rotor core to produce a starting torque by the generation of induced current at the machine's starting;

wherein a substantially zero load is connected to the rotor core when the machine is operated below a rated rotation value, while the load is proportional to a power frequency cubed when the machine is operated above the rated rotation value;

the conductors' resistivity during regular driving of the machine equals 150% of the resistivity of aluminum;

the rotor is constructed so that the average of magnetic flux in the air gap between the rotor and the stator, which is produced by the permanent magnets, ranges from 0.3 (T) to 0.7 (T); and the rotor core is constructed so that the ratio (Lq/Ld) of self-inductance (Lq) of the magnetic portion in a hard-magnetizing direction to self-inductance (Ld) in an easy-magnetizing direction under a rated load condition is within a range from 0.1 to 0.4.

* * * * *